United States Patent [19]

Weber

[11] Patent Number: 4,807,998
[45] Date of Patent: Feb. 28, 1989

[54] RING LASER HAVING AMPLITUDE AND PHASE CONTROLLED EXTERNALLY INJECTED BACK SCATTER

[75] Inventor: Mark W. Weber, Elk River, Minn.

[73] Assignee: Honeywell Inc., Minneapolis, Minn.

[21] Appl. No.: 843,957

[22] Filed: Mar. 25, 1986

[51] Int. Cl.⁴ .............................................. G01C 19/64
[52] U.S. Cl. ................................................... 356/350
[58] Field of Search ......................................... 356/350

[56] References Cited

U.S. PATENT DOCUMENTS 3,697,181 10/1972 Macek et al. ......................... 356/350

FOREIGN PATENT DOCUMENTS 0129838 1/1985 European Pat. Off. ............ 356/350

Primary Examiner—Vincent P. McGraw
Assistant Examiner—S. A. Turner
Attorney, Agent, or Firm—Robert A. Pajak

[57] ABSTRACT

A portion of each of the pair of counter-propagating laser beams in a ring laser cavity are extracted and redirected back into the cavity with servo controlled phase and amplitude. The phase and amplitude of one of the redirected beams is a function of a common first discriminant signal but independently controlled, and the phase and the amplitude of the second redirected beam is responsive to a second mutually exclusive discriminant signal and independently controlled. The redirected beams are such as to minimize the internal back scattering effects within the ring laser cavity.

6 Claims, 2 Drawing Sheets

RING LASER HAVING AMPLITUDE AND PHASE CONTROLLED EXTERNALLY INJECTED BACK SCATTER

FIELD OF THE INVENTION

This invention relates to ring laser angular rate sensors, and more particularly to a system for minimizing lock-in error in said sensors.

BACKGROUND OF THE INVENTION

Ring laser angular rate sensors are well known and are particularly described in U.S. Pat. No. 3,373,650, issued to Killpatrick, U.S. Pat. No. 3,390,606, issued to Podgorski, and U.S. Pat. No. 4,151,071, issued to Podgorski, all of which are assigned to the assignee of the present invention. The above-referred to patents are incorporated herein by reference thereto. Ring laser angular rate sensors of the type referred to commonly employ a block of material that is dimensionally stable, both thermally and mechanically. The block usually includes a plurality of interconnected gas containing tunnels or passages which form a closed-loop path in the shape of a triangle, a rectangle, or any polygonal path. At each intersection of a pair of interconnected tunnels is a mirror mounted on the block. This arrangement of mirrors and interconnected tunnels forms an optical closed-loop path or cavity. Further, at least one anode and one cathode are each mounted on the block and in communication with the gas. Each of the components, including the mirrors, anode, and cathode, must be sealed to the block to form a gas tight seal. The block is usually filled with a lasing gas such as a mixture of helium and neon. A sufficiently large electrical potential is applied between the anode and cathode to cause a discharge current therebetween which results in the production of a pair of counter-propagating laser beams within the block.

Associated with ring laser angular rate sensors is a source of error usually referred to as "lock-in." The source of error is thought to be predominantly caused by back scattering of light at each of the mirrors which form in part the optical closed-loop path which the counter-propagating laser beams traverse. As is well understood by those skilled in the art, there are two widely used techniques applied together to minimize the lock-in error. The first technique consists of dithering the block as taught in U.S. Pat. No. 3,373,650. Mechanically dithering the laser block reduces the source of error caused by lock-in to acceptable levels such that ring laser angular rate sensors have become commercially successful. The second technique consists of producing mirror assemblies structured so as to provide highly polished substrates having superior reflective coatings which achieve minimal laser beam scattering at the surfaces thereof. Development of the mirror assemblies over the years has made it possible for high performance ring laser angular rate sensors.

U.S. Pat. No. 3,697,181, issued to Macek, et al teaches another technique for eliminating the lock-in effect in ring lasers. In the apparatus of Macek, a portion of each of the counter-propagating laser beams is extracted from the cavity and reflected back into the cavity in the direction of the oppositely traversing beam. The redirected beam is controlled in phase and amplitude in a manner as described in the specification of the aforementioned patent in order to reduce the effects of lock-in.

BRIEF DESCRIPTION OF THE INVENTION

In the ring laser angular rate sensor of the present invention, a portion of each of the counter-propagating laser beams are extracted and redirected back into the cavity. The beam portions redirected back into the cavity are each separately controlled in phase and amplitude. Four independent servo control loops, which are responsive to four unique dithering frequencies, respectively, control the phase and amplitude of the redirected beam portions.

DETAILED DESCRIPTION OF THE INVENTION

Figure 1:
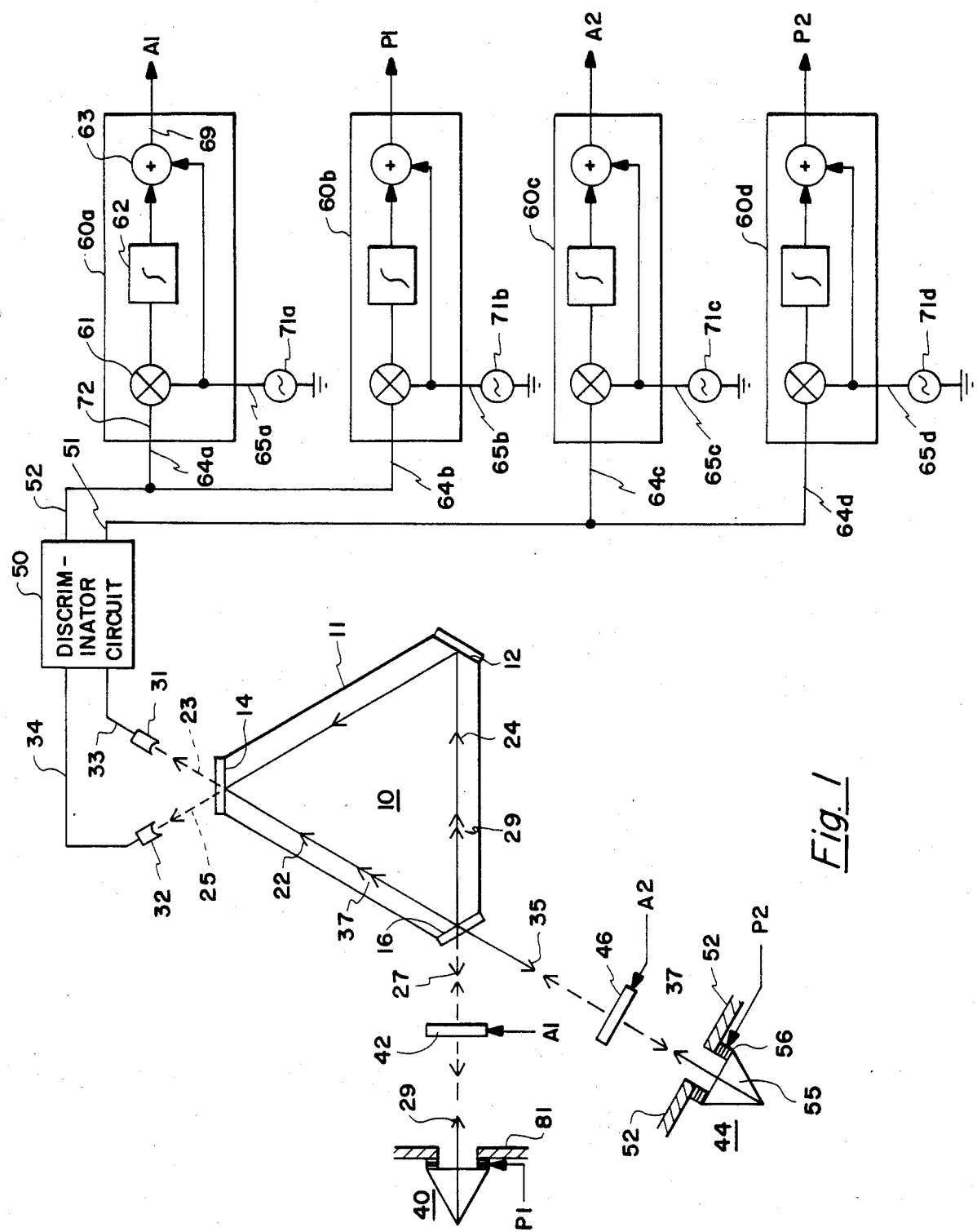
FIG. 1 is a schematic block diagram of a ring laser angular rate sensor in accordance with the present invention.

FIG. 1 illustrates an embodiment of the present invention in combination with a ring laser cavity 10 in the shape of a triangle. Other cavity shapes are within the scope of the present invention as should be recognized by those skilled in the art. For example, the rectangular configuration is illustrated in U.S. Pat. No. 3,697,181.

Cavity 10 serves to provide a pair of counter-propagating laser beams 22 and 24 to travel along a triangular closed loop optical path defined by mirrors as will be described. In the drawing of FIG. 1, laser beams within cavity 10 are shown as full line segments, and beams external to the cavity are shown as dotted line segments. Cavity 10 usually comprises a plurality of interconnecting tunnels in a dimensionally stable block 11 as particularly shown in U.S. Pat. No. 3,390,606. The mirrors are bonded to the block and substantially define the lasing path in a well known manner.

The resonant cavity 10 includes a reflective mirror 12 and partially transmissive mirrors 14 and 16. Beam 22 traverses the cavity in a CW direction and beam 24 traverses the cavity in the CCW direction. A portion of beam 22 is transmitted through mirror 14, identified as beam portion 23, and impinges on photodetector 31. A portion of beam 24 is transmitted through mirror 14, identified as beam 25, and impinges on photodetector 32.

A portion of beam 22 is also transmitted through mirror 16 and is identified as beam 27. Beam 27 impinges upon controllable retroreflector 40 through controllable atenuator 42. Retroreflector 4 reflects a beam 29 passing through controllable atenuator 42 and mirror 16 and re-enters cavity 10 through mirror 16 to coexist with beams 22 and 24, and in the same direction as beam 24.

In a similar manner, a portion of beam 22 is transmitted through mirror 16 and is identified as beam 35. Beam 35 impinges upon controllable retroreflector 44 through controllable atenuator 46. Retroreflector 40 reflects a beam 37 passing through controllable atenuator 46 and re-enters cavity 10 through mirror 16 to coexist with beams 22 and 24, and in the same direction as beam 22. Beams 22, 24, 29 and 37 coexist in cavity 10 and traverse substantially the same optical closed-loop path.

Photodetectors 31 and 32 have output signals 33 and 34, respectively, which are presented to a discriminator circuit 50 for providing discriminant signals 51 and 52. Examples of discriminator circuit 50 are described below with respect to FIGS. 2 and 3.

FIG. 1 also shows four servo circuits 60a, 60b, 60c, and 60d. Servo circuits 60a–d are substantially identical, and therefore only servo circuit 60a will be described. Servo circuit 60a includes a demodulator 61 shown as a multiplier, integrator 62, and summing circuit 63 having an output signal 69 identified as signal A1. Multiplier 61 receives discriminant signal 52 on signal input line 64a and also a dither frequency signal on input signal line 65a which is also presented as one input to summing circuit 69. Signal input line 65a is shown connected to frequency source 71a having a frequency F1. Servo circuit 60b has discriminant signal 52 connected to signal input line 64b. Source 71b having frequency F2 is connected to signal input 65b. The output signal of servo circuit 60b is identified as signal P1.

Servo circuit 60c has discriminant signal 51 connected to signal input line 64c. Source 71c having frequency F3 is connected to signal input 65c. The output signal of servo circuit 60c is identified as signal A2.

Servo circuit 60d has discriminant signal 51 connected to signal input line 64d. Source 71d having frequency F4 is connected to signal input 65d. The output signal of servo circuit 60d is identified as signal P2.

Controllable atenuators 42 and 46 are responsive to servo control circuit outputs A1 and A2, respectively. Controllable atenuators 42 and 46 pass light beams therethrough in both directions. The intensity or amplitude of beam 29 or beam 37 redirected into the cavity 10 is under direct control of signals A2 and A1, respectively. Controllable atenuators may be provided by a wide variety of known optical devices for providing the intended function.

Controllable retroreflectors 40 and 44 are substantially identical. Controllable retroreflector 44 will now be briefly described. Retroreflector 44 includes a retroreflector prism 55 attached to a piezoelectric device 56 or some other means for providing small linear motions. Piezoelectric device 56 receives electrical signals from servo 60b output signal P2. The piezoelectric device is securely fastened to support 52.

Retroreflector 40 and 44 are shown removed from block 11. Prism 55 is particularly shown bonded to an independent support 52. However, prism 55 is preferably mounted to the laser block 11. In other words, block 11 may provide support 55 for both retroreflector 40 and 44. The retroreflector may be bonded to a back side of a substrate of mirror 16.

In operation, prism 55 may be moved along a line parallel with beams 35 and 37 so as to control the phase of the beam redirected back into cavity 10. This is so since the distance between prism 55 and the re-entry point to cavity 10 via mirror 16 is varied in accordance with signal P2. Portions of a wavelength change in either direction will change the phase of the redirected beam 37.

It should be recognized by those skilled in the art, the output signals of photodetectors 31 and 32 are signals representative of the intensity of each of the beams, respectively, but more particularly, includes an AC component or modulation component indicative of the coupling between the two beams caused by back scattering of the beams within the laser cavity. The modulation component is described in U.S. Pat. No. 4,151,071. The source of back scattering is thought to be caused by, among others, reflection from the mirrors as well as coupling along the path of the waves. These modulations, as will subsequently be described, are dithered in the present invention in accordance with frequencies F1, F2, F3, F4, and demodulated by servo circuits 60a, 60b, 60c, and 60d, respectively. As is well known to those skilled in the art, signals A1, P1, A2, and P2, are each generally DC signals for controlling atenuator 42, phase controller 40, atenuator 46, and phase controller 44, respectively.

Figure 2:
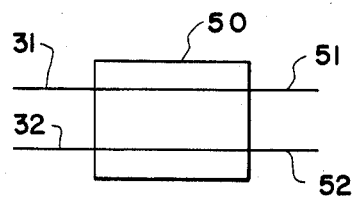
FIG. 2 shows a schematic diagram of one embodiment of a discriminator circuit.

FIG. 2 illustrates one embodiment of a discriminantor circuit 50. In FIG. 2, the output of detector 31 having signal line 33 becomes the output signal 51, and the output of photodetector 32, having signal line 34, becomes output signal 52.

The circuit of FIG. 1 operates such that servo circuits 60a–d independently control atenuators 42 and 46 and phase controllers 40 and 44 toward a minimum lock-in condition. A minimum lock-in condition is indicated by a minimum modulation amplitude of the counter-propagating laser beams at each of the dither frequencies F1, F2, F3, and F4. Photodetector 31 responds to a portion of both beam 22 and redirected beam 37, and photodetector 32 responds to a portion of both beam 24 and redirected beam 29. With the discriminator circuit 50 of FIG. 2, the output of photodetector 32 becomes the discriminant signal 52 which in turn is presented to servo control circuit 60a and 60b having outputs A1 and P1, respectively. Servo control circuits 60a and 60b independently control atenuator 42 and phase controller 40, respectively, to drive the combined beam modulations of beams 24 and 29 to a minimum. In a similar manner, the output of photodetector 31 provides the discriminant signal 51 which in turn is presented to servo control circuit 60c and 60d having outputs A2 and P2, respectively. Servo control circuits 60c and 60d independently control atenuator 46 and phase controller 44, respectively, to drive the combined beam modulations of beams 22 and 37 to a minimum.

It should be noted that the four independent servo circuits 60–d are dithered at different frequencies in order to separate each of their affects. These frequencies should be chosen to reduce cross-talk, for example:

$F1 = F_o/2$
$F2 = F_o/3$
$F3 = F_o/5$
$F4 = F_o/7$

Discriminator circuit 50 may be any circuit which derives discriminant signals 51 and 52 as a function of the intensity modulations as detected by photodetectors 31 and 32. There are many possibilities of discriminant circuit 50 which may use the photodetector signals separately, as illustrated in FIG. 2 or may combine the signals 33 and 34 in accordance with a preselected function so as to make the closed-loop servo circuits work better.

The modulation of the intensity of each of the two beams can be described as follows:

$$X_2 = \frac{-F_1\theta_{21} + F_2(S + \beta_1)}{(S + \beta_2)(S + \beta_1) - \theta_{12}\theta_{21}}$$

$$X_1 = \frac{-F_2\theta_{12} + F_1(S + \beta_2)}{(S + \beta_1)(S + \beta_2) - \theta_{12}\theta_{21}}$$

where
$X_2$ = modulation of beam 2 (shown as beam 24)
$X_1$ = modulation of beam 1 (shown as beam 22)
$F_1$ = magnitude and phase of scatter from beam 2 to beam 1
$F_2$ = magnitude and phase of scatter from beam 1 and beam 2
$\beta_1, \beta_2, \theta_{12}, \theta_{21}$ are the Lamb coefficients associated with a sensor cavity of length L and includes the coefficient C/L where C is the speed of light
S = Laplace variable = $j\Omega + \sigma$ The mathematical expression above where derived by using standard laplace transform techniques based on the Aronowitz equations (IEEE Quantum Electronics, Vol. QE-13, No. 5, May 1977, *Positive Scale Factor Correction in a Rino Laser Gyro*, pg. 338). Standard assumptions such as the modulation intensity being much smaller than the average intensity where also used. In the above expressions the Laplace variable S contains the rotation rate $\Omega$ instead of the usual variable $\omega$.

The above equations show that $X_2$ and $X_1$ have contributions from both $F_1$ and $F_2$, (back scattering coefficients $r_1$ and $r_2$); and that if both $X_2$ and $X_1$ are minimized, $F_1$ and $F_2$ will be minimized and therefore $r_1$ and $r_2$ will be minimized. Therefore, the discriminator circuit shown in FIG. 2 was shown to be a pair of straight through wires.

Figure 3:
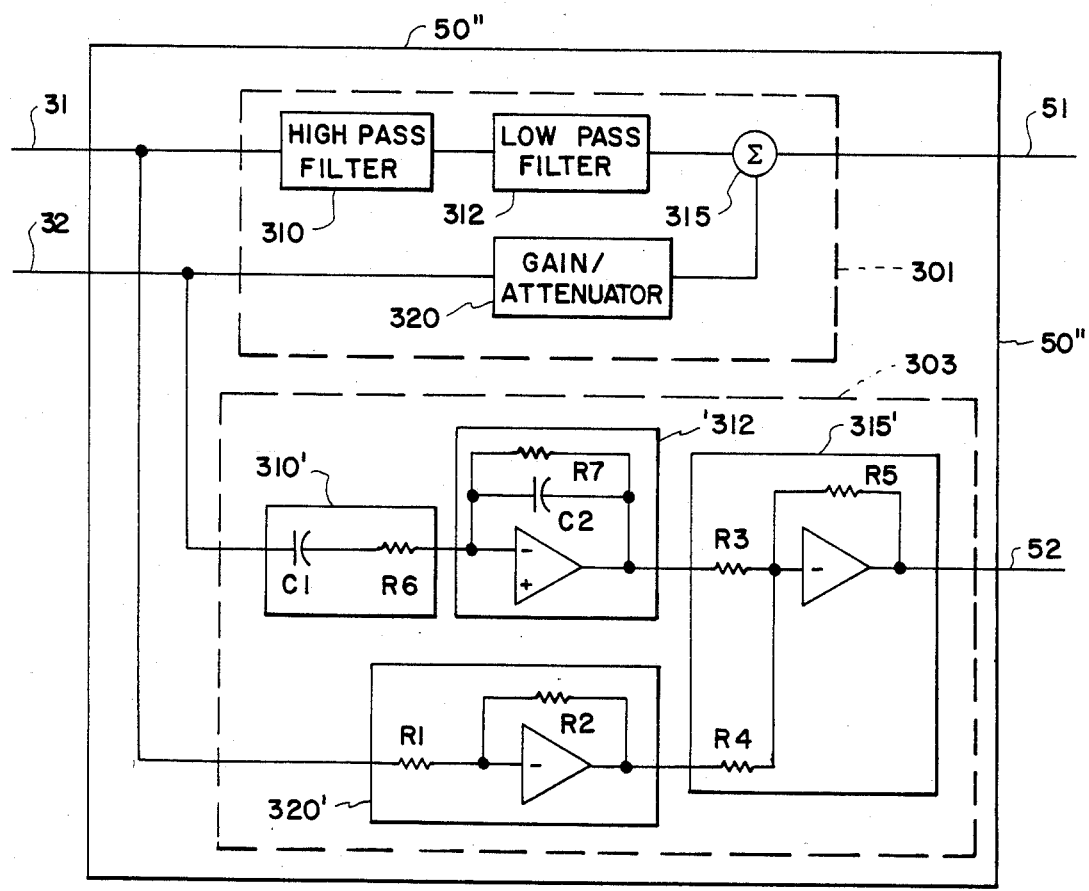
FIG. 3 is a schematic block diagram of another embodiment of a discriminator circuit.

In a second example, as is illustrated in FIG. 3, the discriminator circuit 50" uses analog signal preprocessing to develop signals 51 and 52 that depend on substantially only one backscatter coefficient rather than both. This will take some of the burden off of the closed circuit servo loop. The circuit of FIG. 3 may be mathematically expressed as follows:

$$Y_1 = X_2Q + X_1\frac{(S + P)Z}{(S + Z)}$$

$$Y_2 = X_1Q + X_2\frac{(S + P)Z}{(S + Z)}$$

where:
$Y_1$ = signal 51
$Y_2$ = signal 52
Z = frequency breakpoint chosen for operational convenience
P = breakpoint frequency related to the cavity Lamb coefficients $\beta_1$ and $\beta_2$
Q = gain factor related to the cavity Lamb coefficients $\theta_{12}$ and $\theta_{21}$ Straight forward algebra will show that for low rates, where $Y_1$ and $Y_2$ are largest, $Y_1$ depends only on $F_1$ and $Y_2$ depends only on $F_2$. The algebraic equations for $Y_1$ and $Y_2$ assume that the cavity Lamb coefficients, for beams traveling in opposite directions in the cavity, are such that $\theta = \theta_{12} = \theta_{21}$ and that $\beta = \beta_1 = \beta$hd 2. In the expressions, the output signal $Y_1$ is a function of the differentiated time varying function of $X_1$ and a simple function of $X_2$ multiplied by a gain factor i.e., the lamb coefficient $\theta$. Circuitry which performs the above expressions is illustrated in FIG. 3.

Figure 4:
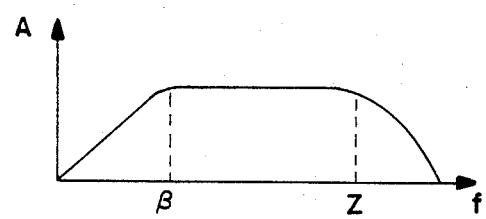
FIG. 4 is a frequency vs. amplitude diagram of a circuit filter embodied in FIG. 3.

In FIG. 3, discriminator circuit 50", which may be substituted for circuit 50 in FIG. 1, is shown having two transfer function signal generators 301 and 303 which perform in accordance with the previously described mathematical expressions. Specifically, signal 31 is passed through a high pass filter 310 and then through a low pass filter by circuit 312 and summed by summing circuit 315 with signal 32 passing through gain/atenuator circuit 320 to provide the discriminant signal 51. The combination of filters 310 and 312 function as a band pass filter as illustrated in FIG. 4. The first circuit breakpoint frequency $\beta$ is chosen to match the natural sensor breakpoint which is a function of the sensor parameters, and the second breakpoint frequency Z is selected to obtain good operational performance. Signals 31, 32 and 51 correspond with signals having the same numeral designations in FIG. 1.

Transfer function generators 301 and 303 are substantially identical circuits. Generator 303 shows substantially more detail of the same blocks of generator 301. Below the FIG. 3 are the values and/or relationships of the various specific components illustrated in the detail of generator 303 to further understanding of the present invention.

There are, of course, a wide variety of transfer function generators which may be used in place of those shown in the circuit of FIG. 3 for implementation of a discriminator circuit 50". This variety of circuits will more or less improve the performance of the four independent control circuits as illustrated in the embodiments of the present invention.

In the embodiments of the invention illustrated with respect to FIGS. 1-3, the system may be dithered in accordance with practice well known in the art and may also include path length controls, as are also well known. Therefore, while the present invention has been disclosed in connection with the preferred embodiments thereof, it should be understood that there may be other embodiments which fall within the spirit and scope of the invention as defined by the following claims.

I claim:
1. A ring laser angular rate sensor comprising:
a ring cavity having counter-propagating first and second laser beams;
means for extracting a first beam portion of said first laser beam along a first path, and for extracting a second beam portion of said second laser beam along a second path;
first means located external to said ring cavity for retroreflecting said first beam portion thereby directing a third beam portion back into said cavity in the direction of said second beam, said first means having,
  means responsive to a first control signal for varying the energy of said third beam portion, and
  first phase control means responsive to a second control signal for varying the phase of said third beam portion;
second means located external to said ring cavity for retroreflecting said second beam portion thereby directing a fourth beam portion back into said cavity in the direction of said first beam, said second means having,
means responsive to a third control signal for varying the energy of said fourth beam portion, and
second phase control means responsive to a fourth control signal for varying the phase of said fourth beam portion;

first detection means responsive to a portion of said first beam and said fourth beam portion for providing a first intensity signal indicative thereof;

second detection means responsive to a portion of said second beam and said third beam portion for providing a second intensity signal indicative thereof;

first servo control means for generating said first control signal in response to a first input signal as a function of said second intensity signal, said first servo control means including,
  means for dithering said first control signal at a first dither frequency, and
  means for producing said first control signal to minimize the amplitude of the signal component of said first input signal at said first dither frequency;

second servo control means for generating said second control signal in response to a second input signal as a function of said second intensity signal, said second servo control means including,
  means for dithering said second control signal at a second dither frequency, and
  means for producing said second control signal to minimize the amplitude of the signal component of said second input signal at said second dither frequency;

third servo control means for generating said third control signal in response to a third input signal as a function of said first intensity signal, said third servo control means including,
  means for dithering said third control signal at a third dither frequency, and
  means for producing said third control signal to minimize the amplitude of the signal component of said third input signal at said third dither frequency; and fourth servo control means for generating said fourth control signal in response to fourth input signal as a function of said first intensity signal, said fourth servo control means including,
  means for dithering said fourth control signal at a fourth dither frequency, and
  means for producing said fourth control signal to minimize the amplitude of the signal component of said fourth input signal at said fourth dither frequency.

2. The apparatus of claim 1 wherein said first input signal is a function of said first and second intensity signals in accordance with a predetermined relationship, said second input signal is a function of said first and second intensity signals in accordance with a predetermined relationship, said third input signal is a function of said first and second intensity signals in accordance with a predetermined relationship, and said fourth input signal is a function of said first and second intensity signals in accordance with a predetermined relationship.

3. The apparatus of claim 1 wherein said first and second input signals are the same signal, and said third and fourth input signals are the same signal.

4. The apparatus of claim 3 wherein said first servo input signal is said second intensity signal and said third input signal is said first intensity signal.

5. The apparatus of claim 1 wherein said servo control means responds to said input signals in accordance with the following relationships:

$$Y_1 = X_2 Q + X_1 \frac{(S + P)Z}{(S + Z)}$$

$$Y_2 = X_1 Q + X_2 \frac{(S + P)Z}{(S + Z)}$$

where
  $X_1$ and $X_2$ are said first and second intensity signals, respectively,
  $Y_1$ is said first and second input signals,
  $Y_2$ is said third and fourth input signals,
  $Z$ is a selected breakpoint frequency, and
  $P$ is a selected breakpoint frequency related to the Lamb coefficient $\beta$,
  $Q$ is a gain factor related to the Lamb coefficient $\theta$.

6. The sensor of claim 1 further comprising:
  a block for providing said cavity;
  said first phase control means includes a first retroreflecting means secured to said block; and
  said second means includes a second retroreflecting means secured to said block.

* * * * *